United States Patent [19]

Jones et al.

[11] Patent Number: 4,725,143
[45] Date of Patent: Feb. 16, 1988

[54] INTERFEROMETRIC SENSOR

[75] Inventors: Julian D. C. Jones, Sittingbourne; David A. Jackson, Canterbury, both of England; Michael Corke, Wheaton, Ill.

[73] Assignee: Kent Scientific and Industrial Projects Limited, Kent, England

[21] Appl. No.: 845,136

[22] PCT Filed: Jun. 28, 1985

[86] PCT No.: PCT/GB85/00289
§ 371 Date: Feb. 27, 1986
§ 102(e) Date: Feb. 27, 1986

[87] PCT Pub. No.: WO86/00402
PCT Pub. Date: Jan. 16, 1986

[30] Foreign Application Priority Data
Jun. 30, 1984 [GB] United Kingdom ............... 8416709

[51] Int. Cl.⁴ .................................... G01B 9/02
[52] U.S. Cl. .......................... 356/351; 250/227
[58] Field of Search ............. 356/345, 351; 250/227

[56] References Cited

U.S. PATENT DOCUMENTS
4,442,350 4/1984 Rashleigh ..................... 250/227

FOREIGN PATENT DOCUMENTS
38950 11/1981 European Pat. Off. .
104932 4/1984 European Pat. Off. .
3031961 3/1982 Fed. Rep. of Germany .
2057681 4/1981 United Kingdom .
2117132 10/1983 United Kingdom .
2144215 2/1985 United Kingdom .

Primary Examiner—Davis L. Willis
Assistant Examiner—Matthew W. Koren
Attorney, Agent, or Firm—Bell, Seltzer, Park & Gibson

[57] ABSTRACT

An interferometric sensor includes an optical fiber polarimetric sensing element (5) for detecting a required measurand and is configured so as to derive interference output signals, which are simultaneously monitored by photodetectors (9, 11), from both conventional, for example, Michelson, and polarimetric interferometer arrangements. The sensor therefore offers the high resolution of a conventional interferometer in conjunction with the increased dynamic range of a polarimetric device.

14 Claims, 2 Drawing Figures

INTERFEROMETRIC SENSOR

BACKGROUND OF THE INVENTION

The present invention relates to an interferometric sensor and, more particularly, to such a sensor which combines the features of two different configurations of interferometer in order to provide a measuring instrument which has relatively high resolution over an improved unambiguous dynamic range.

A conventional interferometric sensor, for example, embodying a Michelson, Fabry-Perot or Mach-Zehnder configuration, in which a measurand is detected by the change in optical path length induced in a sensing element, has been shown to be applicable to a wide variety of measurands, such as, temperature, acceleration, magnetic field, fluid flow and acoustic pressure, and extremely high resolution has been achieved. However, because the interferometer output is periodic, the value of the measurand derived is ambiguous and the inherent high resolution results in a very limited unambiguous dynamic range. Signal processing schemes, including active phase compensation and heterodyne schemes, have been developed which overcome problems of signal fading and extend the dynamic range. However, these schemes do not provide the absolute value of the measurand when the system is initialised.

More recently, optical fibre polarimetric sensors, which utilise the measurand-induced change in modal birefringence of highly birefringent optical fibre, have been proposed. These polarimetric sensors have a much reduced resolution with a corresponding increase in the period of the interferometer transfer function and they therefore provide an increased unambiguous dynamic range at the expense of reduced resolution. Generally, the ratio of sensitivities for conventional and polarimetric configurations is different for different measurands.

SUMMARY OF THE INVENTION

An object of the present invention is to provide a novel configuration of interferometric sensor which combines the features of conventional and polarimetric interferometers to produce a measuring instrument having the wider unambiguous dynamic range of a polarimetric interferometer and the higher resolution of a conventional interferometer.

To this end, the invention consists in an interferometric sensor characterised by a sensing element adapted to detect a required measurand and comprising a polarimetric interferometer device, means for illuminating the polarimetric sensing element with an input beam of polarised, e.g. linearly polarised, light, means for deriving a reference light beam from the input light beam, and means for selectively mixing the output light beams of the polarimetric sensing element and the reference light beam to produce interference signals corresponding to the phase differences of the mixed beams.

Preferably, the means for selectively mixing the light beams is arranged to mix the two output light beams of the polarimetric sensing element to produce one interference signal and mix a selected one of the output beams of the sensing element with the reference light beam to produce the other interference signal.

Hence, by utilising one of the output beams of the polarimetric sensing element in conjunction with the reference light beam, the present invention effectively combines the features of a conventional interferometer, for example, a Michelson or Fabry-Perot interferometer, with the polarimetric interferometer forming the sensing element and thereby enables the construction of a measuring instrument which has the high resolution of a conventional interferometer over a wider unambiguous dynamic range than hitherto. The invention also enables the simultaneous determination of more than one measurand.

The means for selectively mixing the light beams may comprise linear or plane polarising elements. The interference signals provided by the selectively mixed beams may be sensed by photodetectors which produce electrical signals corresponding to the interference signals, and signal processing means may be connected to the photodetector outputs for producing an output signal representing the measurand. In one preferred embodiment, beam splitting elements are respectively arranged to reflect fractions of the output light beams of the polarimetric sensing element towards the individual photodetectors and the linear polarising elements are disposed in the light paths between the beam splitting elements and the photodetectors for analysing the light beams and permitting only the selected light beams having the appropriate polarisation components to impinge on the photodetectors.

The reference light beam may be derived by reflection of a fraction of the input light beam and the conventional interferometer of the sensor may thus have a Michelson or Fabry-Perot configuration. For example, to provide a Michelson configuration, the beam splitting element associated with the photodetector sensing the interference signal produced by the conventional interferometric configuration may also be arranged to reflect a fraction of the input light beam onto a reflective surface which is disposed transversely of the input light path and which, in turn, reflects the resulting reference light beam towards the associated photodetector. In an alternative Fabry-Perot configuration, a fraction of the input light beam may be reflected from the input end of the polarimetric sensing element, the resulting reference light beam being reflected towards the photodetectors, together with the output light beams of the polarimetric sensing element, by the beam splitting elements.

Preferably, the polarimetric sensing element is an optical fibre element and, conveniently, a birefringent optical fibre, such as, commercially available "bow-tie" fibre, having substantially orthogonal eigen modes oriented so that both modes are excited by the linearly polarised input light beam. The distal end of the fibre sensing element may be reflective so that return light beams are propagated in the sensing element, the output of the latter being at the same end as its input.

BRIEF DESCRIPTION OF THE DRAWINGS

In order that the invention may be more readily understood, reference will now be made to the accompanying drawings, in which.

DESCRIPTION OF THE PREFERRED EMBODIMENTS

Figure 1:
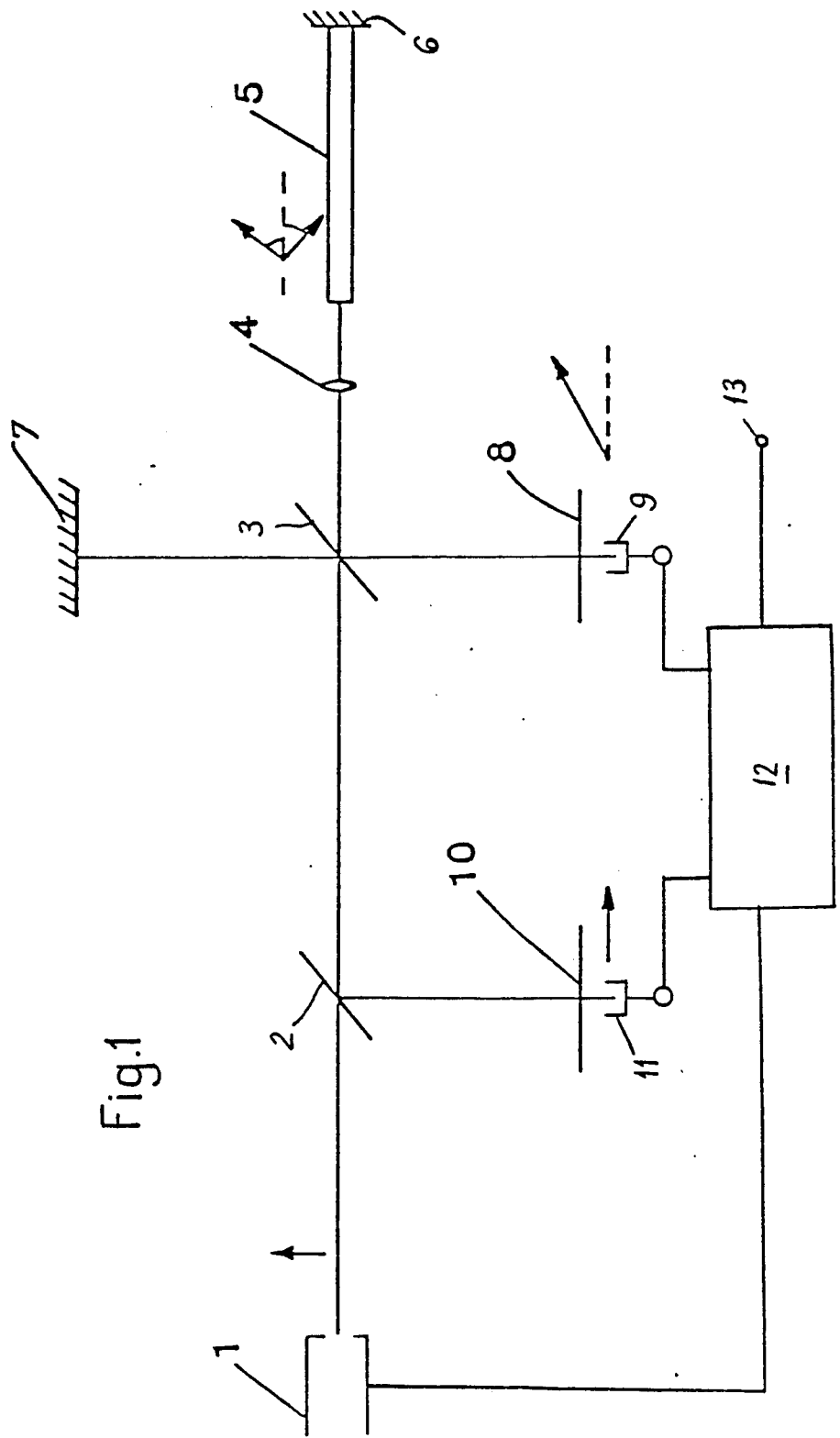
FIG. 1 diagrammatically illustrates one embodiment of the invention which combines Michelson and polarimetric configurations.

Referring to FIG. 1 of the drawings, the sensor comprises a suitable laser light source 1, for example, a 5 mW helium-neon laser for producing a collimated beam of coherent and linearly or plane polarised light. This light is launched via two beam-splitters 2,3 and a collimating lens 4 into the input of an optical fibre polarimetric interferometric device serving as a sensing element 5 and suitably adapted to detect a required measurand. The polarimetric sensing element 5 comprises a short length of highly birefringent single-mode optical fibre, such as, 2 mm beat length "bow-tie" fibre supplied by York Technology, having substantially orthogonal eigen modes. The angular orientation of the sensing fibre is adjusted so that the eigen mode axes are each at 45° to the plane of polarisation of the input beam, thus assuring that both eigen modes are excited substantially equally. The ends of the fibre are cleaved to provide normal end faces and the distal end 6 is silver coated so as to be reflective.

The input light beam is amplitude-divided by the beam splitter 3 with the reflected beam being directed onto a mirror 7 mounted orthogonally with respect to the input light path so as to produce a reference light beam. The silvered end of the fibre sensing element 5 propagates return light beams in both eigen modes of the fibre to produce output beams returning along the input light path. These output beams are collimated by the lens 4 and amplitude-divided by the beam splitters 2,3. The beam reflected from the beam splitter 3 is analysed by a linear polariser or polarisation analyser 8 oriented to transmit the polarisation component corresponding to one of the eigen modes of the fibre sensing element. The analysed beam is then incident on a photodiode detector 9 where it mixes coherently with the reference light beam reflected from the mirror 7. The fractions of the beams transmitted by the beam splitter 3 are reflected by the beam splitter 2, analysed by a linear polariser 10 and detected by a photodiode 11. The linear polariser 10 is oriented orthogonally to the polarisation plane of the input beam and samples fractions of both polarisation components of the eigen modes of the fibre sensing element 5 so that the photodiode 11 monitors only the retardance between the two modes of the sensing element.

Hence, by utilising both orthogonal polarisation eigen modes of the sensing element 5 a polarimetric interferometer is formed, whilst by using only one of the eigen modes of the sensing element in conjunction with the reference light beam a Michelson interferometer is formed. The linear polarisers 8,10 are used to resolve the interferometer outputs so that they may be monitored independently and simultaneously by the photodiodes 9,11 the resulting electrical output signals from the photodiodes corresponding to the phase differences of the two light beams mixed by the respective interferometers. The outputs of the photodiodes are connected to a suitable electronic signal processing system 12 for controlling the light source 1 and producing a signal at its output 13 corresponding to the measurand. This signal processing system may be generally similar to that described in our International specification No. W084/04385, with the circuitry for processing the photodiode output duplicated to accommodate the two photodiodes 9,11 of the present sensor. The adaption of such a system to the interferometric sensor of the present invention will be readily apparent to a person skilled in this field and, since the system 12 does not form an essential part of the present invention, it will not be described in further detail. Also, the system described in the aforementioned specification is only one example of the signal processing electronics which may be used with the present invention. Many other techniques for processing signals from a fibre optic interferometer have been developed which are capable of recovering the outputs of the sensor and producing a reading of the measurand with high resolution and over a wide dynamic range.

In FIG. 1, the arrows indicate the relative polarisation directions of the light at the different positions, the arrows being drawn such that the direction of beam propagation is normal to the plane of the drawing.

The output of the photodiode 11 detected by the processing system 12 is in the form $$I_1 \alpha 1 + K_1 \cos(\phi_1 - \phi_2)$$

where $\phi_1$ and $\phi_2$ are the optical phases corresponding to the guided paths within the sensing element 5 for the orthogonal eigen modes; and $K_1$ is a constant corresponding to the visibility of the polarimetric interference fringes.

The output detected at the photodiode 9 is in the form $$I_2 \alpha 1 + K_2 \cos(\phi_0 - \phi_1)$$

where $\phi_1$ is as previously identified; $\phi_0$ is a constant phase difference resulting from light paths in the signal and reference arms of the Michelson interferometer; and $K_2$ is a visibility constant. The optical phase $\phi_1$ is dependent on the guided optical path length for the selected eigen mode of the fibre sensing element 5, whereas $(\phi_1 - \phi_2)$ is dependent on the modal birefringence between the orthogonal eigen modes; $\phi_1$ and $\phi_1 - \phi_2$ are each functions of the measurand.

In one example of the use of the sensor described above as a temperature sensor, a birefringent optical fibre sensing element 5 having a length of 70 mm was contained within an electrical furnace, whose temperature was independently monitored by a thermocouple. The furnace was heated to a constant temperature and then allowed to cool whilst the output signals from the photodiodes 9,11 were simultaneously monitored. The results are shown in FIG. 2.

Figure 2:
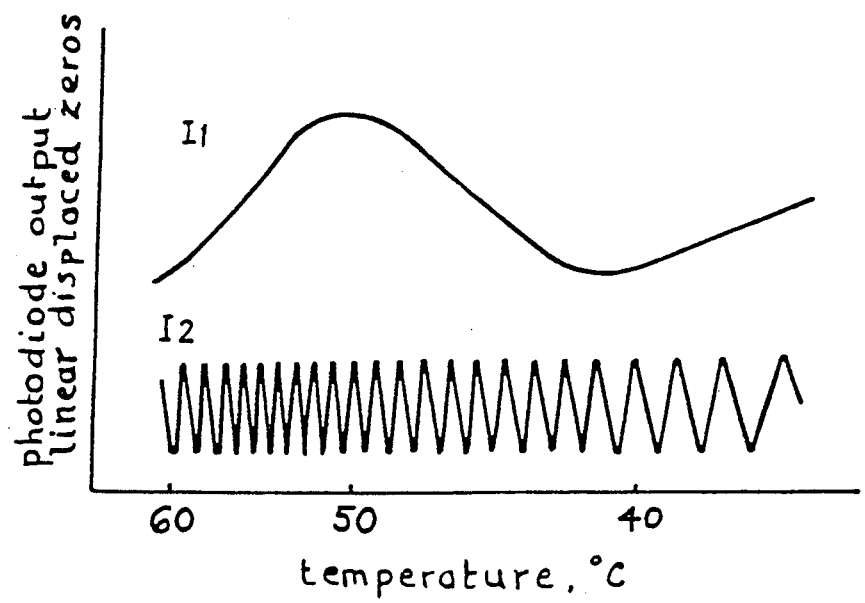
FIG. 2 is a graph illustrating the results achieved with an interferometric temperature sensor constructed as shown in FIG. 1.

From FIG. 2, it is clear that the transfer functions observed at the photodiodes 9,11 are indeed of the expected polarimetric and Michelson forms. The datum pair $(I_1, I_2)$ is unique over one half period of the polarimetric transfer function; hence, the value of $I_1$ may be used to identify the order of interference of the Michelson interferometer within this range, whilst the value of $I_2$ allows the measurand to be recovered with high resolution. It may thus be seen that the unambiguous dynamic range has been increased by a factor of $\sim 20$ in comparison with that of a Michelson interferometer alone. Signal processing schemes developed for fibre optic interferometers have yielded phase sensitivities in the $\mu$rad to mrad range, which is more than adequate to resolve the order of interference of the Michelson output of a sensor according to the present invention. A 1 mrad resolution in the Michelson output of the temperature sensor described above would correspond to a temperature change of $\sim 0.2$ mK, whereas the unambiguous dynamic range of the polarimetric output was ~12 K, giving a dynamic range/resolution ratio of $\gtrsim 5 \times 10^4$. Greater or lesser sensing element lengths may be employed to yield greater or lesser resolution, with consequent narror or wider dynamic range, respectively. However, the dynamic range/resolution ratio remains unchanged. The combined interferometric sensor according to the invention is equally applicable to the measurement of other measurands, such as, pressure, strain and magnetic field.

Another application of the sensor is for the simultaneous determination of two measurands. If the ratio of the phase sensitivities for the polarimetric and Michelson outputs differs for the two selected measurands, then processing of the two photodiode outputs $I_1, I_2$ yields the values of each of the measurands.

Whilst particular embodiments have been described, it will be understood that modifications may be made without departing from the scope of the invention as defined by the appended claims. For example, although the optical configuration of the sensor has been described in terms of a combination of fibre optic and conventional components, functionally identical systems may be constructed using a range of different conventional, integrated and fibre optic components. Moreover, fibre-optic equivalents are available which would enable an all-fibre sensor to be constructed.

We claim:

1. An interferometric sensor comprising, in combination:
    a sensing element adapted to detect a required measurand and comprising a polarimetric interferometer device,
    means for illuminating said polarimetric device with an input beam of polarised light, whereby to cause two light beams to propagate in said polarimetric device and produce two output beams therefrom,
    means for deriving a reference beam of light from said input beam,
    means for mixing said two output beams from said polarimetric device and one of said output beams and said reference beam, respectively, to produce two interference signals corresponding respectively to the phase differences between said two output beams and said one output beam and said reference beam, respectively, and
    means for monitoring and processing said two interference signals to produce a measurement of said measurand.

2. The interferometric sensor claimed in claim 1, wherein said mixing means comprises beam splitting means for splitting said output beams emanating from said polarimetric device into fractions which propagate along first and second optical paths, means for mixing said fraction of said one output beam propagating along said first optical path with said reference beam, and means for intermixing said fractions of said output beams propagating along said second optical path.

3. The interferometric sensor claimed in claim 2, wherein said means for mixing said fraction of said one output beam and said reference beam includes first polarising means located along said first optical path and oriented to transmit only said fraction of said one output beam propagating along said first optical path for mixing with said reference beam.

4. The interferometric sensor claimed in claim 3, wherein said reference beam is derived by reflection of a fraction of said input beam illuminating said polarimetric device.

5. The interferometric sensor claimed in claim 4, including second polarising means located along said second optical path and oriented to transmit only said fractions of both said output beams.

6. The interferometric sensor claimed in claim 2, wherein said monitoring means comprises photodetector means located along said first and second optical paths for sensing said two interference signals and producing electrical output signals corresponding thereto.

7. The interferometric sensor claimed in claim 1, wherein said polarimetric device is an optical fibre sensing element.

8. The interferometric sensor claimed in claim 7, wherein said optical fibre sensing element comprises a birefringent optical fibre having substantially orthogonal eigen modes oriented so that both modes are excited by said polarised input beam of light.

9. The interferometric sensor claimed in claim 7, wherein said optical fibre sensing element has an optical input and an optical output at one end thereof, said illuminating means being arranged to launch said input beam into said one end of said optical fibre sensing element, and said optical fibre sensing element having reflective means at an opposite end, whereby return light beams are propagated in said optical fibre sensing element for producing said two output beams which emanate from said one end thereof.

10. The interferometric sensor claimed in claim 9, wherein said mixing means comprises beam splitting means for splitting said output beams emanating from said one end of said optical fibre sensing element into fractions which propagate along first and second optical paths, means for mixing said fraction of said one beam directed along said first optical path with said reference beam to produce a first one of said interference signals, and means for intermixing said fractions of said output beams propagating along said second optical path to produce a second one of said interference signal.

11. The interferometric sensor claimed in claim 10, wherein said mixing means includes polarising means located respectively along said first and second optical paths and oriented respectively to permit only transmission of the required light beams for producing said interference signals.

12. The interferometric sensor claimed in claim 11, wherein said reference beam is derived by reflection of a fraction of said input beam.

13. The interferometric sensor claimed in claim 12, wherein said beam splitting means is adapted also to reflect said fraction of said input beam forming said reference beam.

14. The interferometric sensor claimed in claim 13, wherein said monitoring means comprising photodetector means located along said first and second optical paths downstream of said polarising means and responsive to said light beams incident thereon to produce electrical output signals corresponding respectively to said two interference signals.

* * * * *